United States Patent [19]
Bates et al.

[11] Patent Number: 5,357,484
[45] Date of Patent: Oct. 18, 1994

[54] METHOD AND APPARATUS FOR LOCATING AN ACOUSTIC SOURCE

[75] Inventors: Bruce J. Bates; Susan M. Bates, both of Portsmouth, R.I.

[73] Assignee: The United States of America as represented by the Secretary of the Navy, Washington, D.C.

[21] Appl. No.: 147,237

[22] Filed: Oct. 22, 1993

[51] Int. Cl.$^5$ .............................................. G01S 3/80
[52] U.S. Cl. ..................................... 367/118; 367/129
[58] Field of Search ............... 367/118, 124, 129, 131; 364/421

[56] References Cited

U.S. PATENT DOCUMENTS

4,446,542 5/1984 Beckerle .............................. 367/131
4,594,662 6/1986 Devaney .............................. 73/602

*Primary Examiner*—Ian J. Lobo
*Attorney, Agent, or Firm*—Michael J. McGowan; Prithvi C. Lall; Michael F. Oglo

[57] ABSTRACT

An apparatus and method for determining the range and depth to an acoustic source from a sampling site in a medium. A linear array of pressure transducers monitors the acoustic field produced by the acoustic source. A measurement processor utilizes the measured acoustic field to produce an initial field condition for each member of the array. An environmental model includes environmental data in the form of acoustically pertinent variables that define acoustic energy transfer characteristics through the medium at different ranges and depths. A backpropagation processor utilizes the initial field condition and the acoustically pertinent variables to produce, for each incremental range and depth, an amplitude function. An index processor normalizes the amplitude functions for each incremental range and depth, and an index extreme value processor selects the amplitude function with the maximum amplitude. The range and depth of that extreme value amplitude function is used to determine the range and depth for the acoustic source.

30 Claims, 7 Drawing Sheets

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
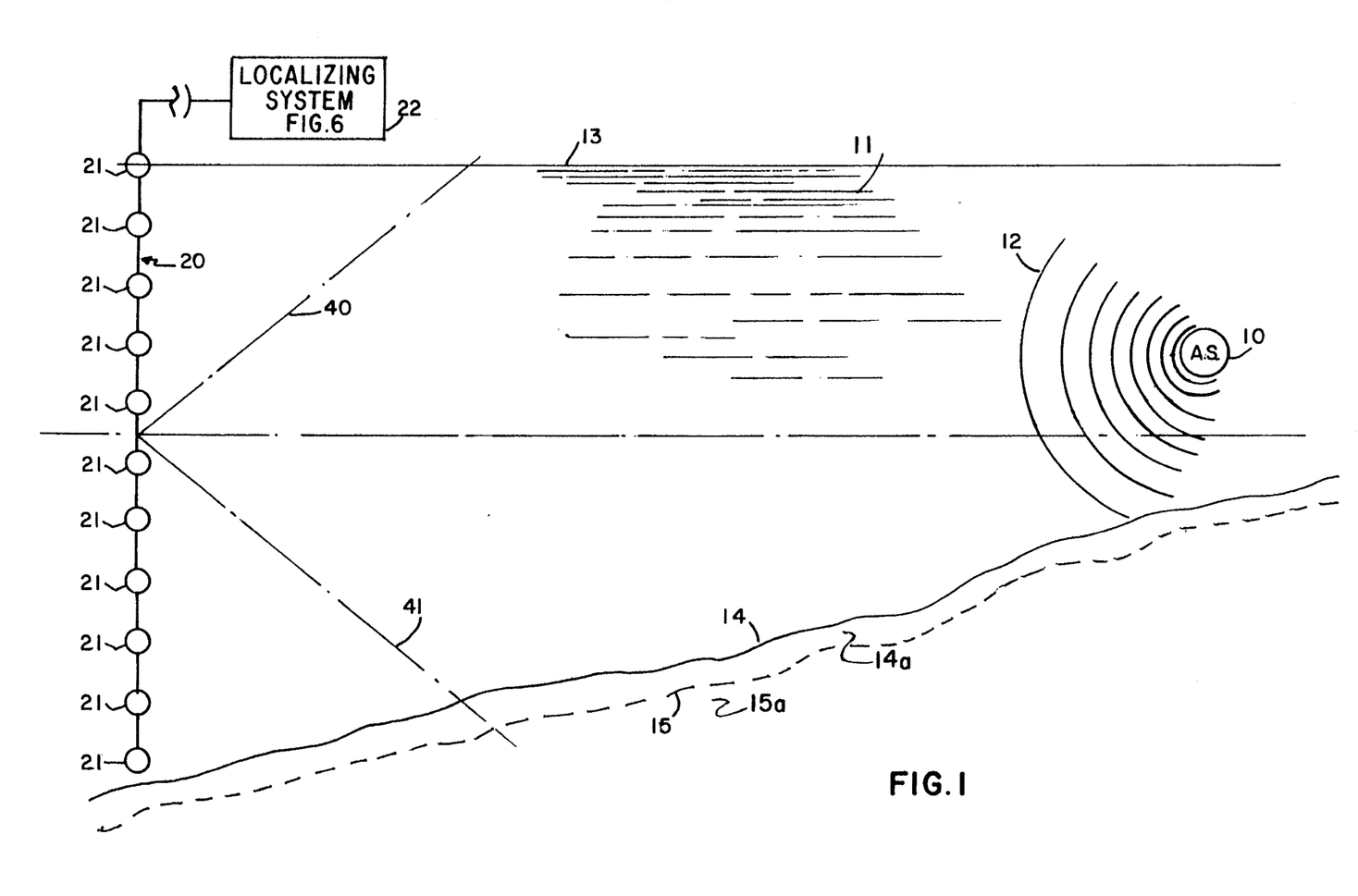
FIG. 1 is a view of a system including a linear transducer array for localizing the position of an acoustic source.

FIG. 1 depicts an acoustic source (A.S.) 10 that is located at some arbitrary depth in sea water 11 and that transmits acoustic energy in the form of acoustic waves 12. The sea water 11 has a variable depth from a seawater surface 13 to the upper surface 14 of a seabed bottom 14a. A dashed line 15 represents the boundary between the seabed bottom 14a and a subbottom 15a. The sea water 11, bottom 14a and subbottom 15a constitute the medium through which the acoustic waves 12 propagate.

A linear array 20 of acoustic transducers 21 extends from the surface 13 to the bottom 14 at some sampling site. Each transducer 21 is at a known depth. The array 20 connects to a localizing system 22 by some communications system such as direct wire or radio wave. The localizing system 22 converts the signals from the array 20 into a range from the array 20 and a depth below the surface 13.

Figure 2:
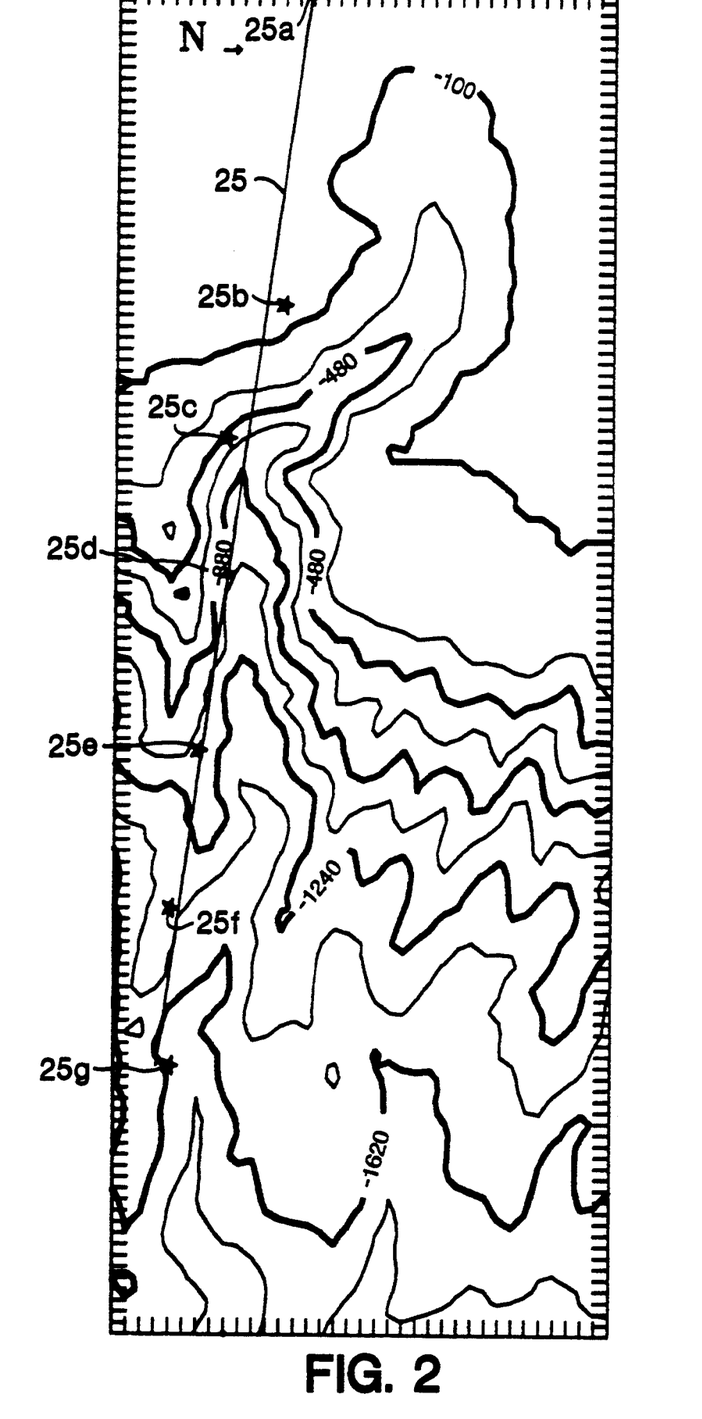
FIG. 2 is contour map depicting the depths of an area of an ocean at various positions within the given volume.
Figure 3:
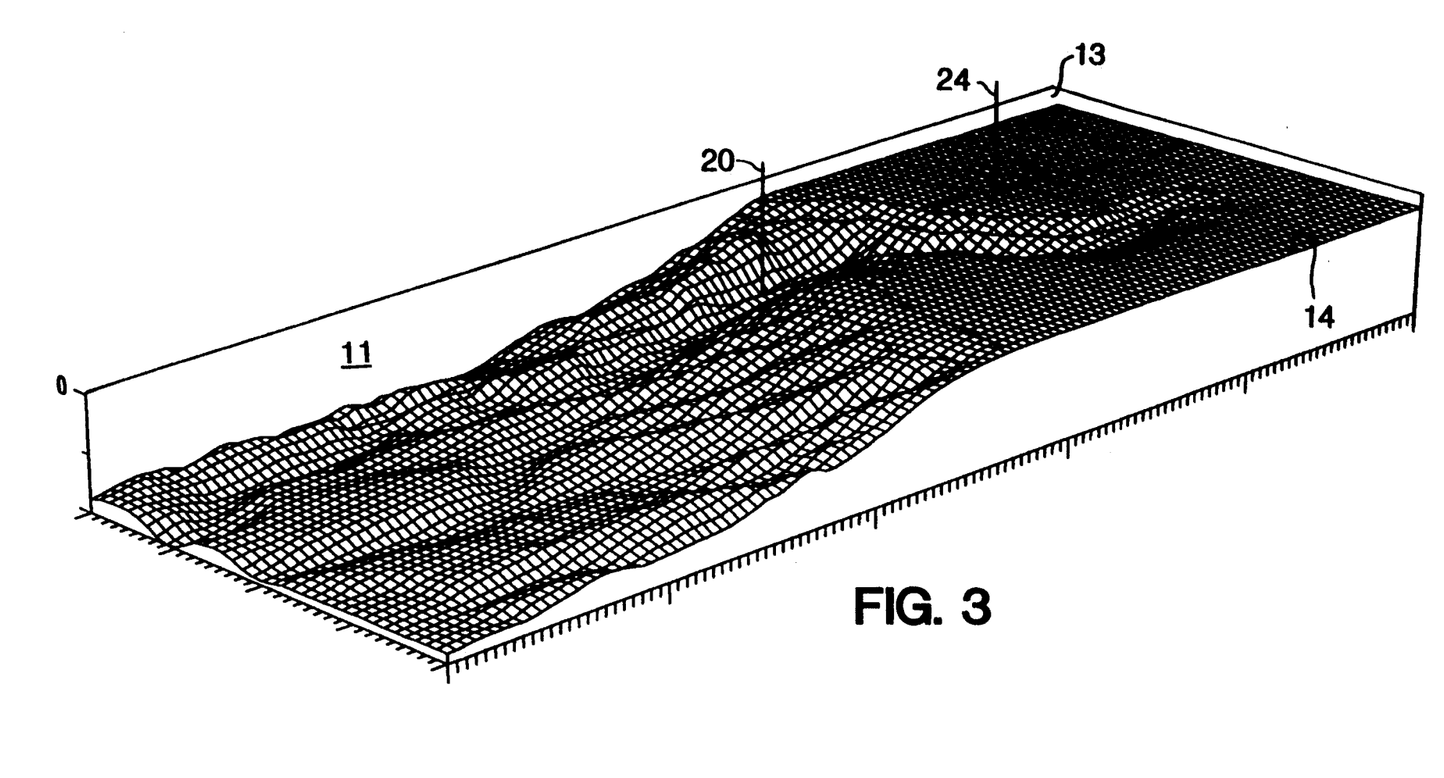
FIG. 3 is a three-dimensional gridded-surface map showing the depth of the volume shown in FIG. 2.

This invention provides accurate range and depth readings because it incorporates a number of acoustically pertinent variables in the localization process. FIGS. 2 through 5 depict conditions that some of those acoustically pertinent variables define. For example, FIGS. 2 and 3 depict the bottom topography of a geographical area being monitored and particularly the volume of that geographical area. FIG. 2 is a contour map of the bottom showing the depth or topography of an area of ocean bottom and FIG. 3 is a perspective corresponding to the topographical information in FIG. 2. In FIG. 3 a volume of water 11 lies over the bottom 14. A vertical line 20 corresponds to the array 20, and a line 24 points to the acoustic source 10.

Figure 4:
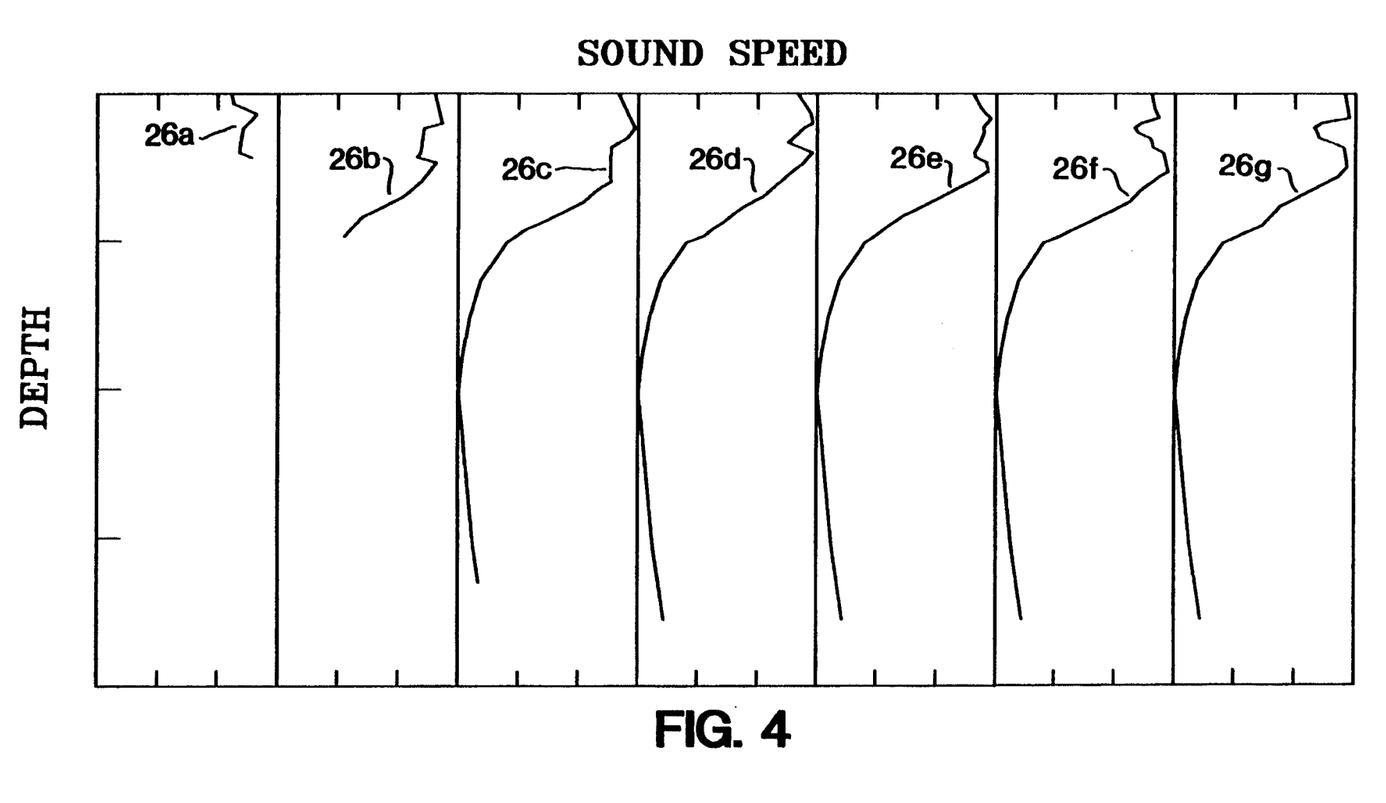
FIG. 4 depicts the measured sound-speed characteristics of the ocean as a function of depth for the volume of FIG. 2.

One particular acoustically pertinent variable is the speed of sound through the water at various depths and locations. A line 25 shown in FIG. 2 extends along a sampling line and includes a plurality of asterisks 25a through 25g that denote specific sound-speed profile measurement sites. Graphs 26a through 26g in FIG. 4 depict the speed of sound as a function of depth for each of the locations 25a through 25g respectively. This information can then be converted by various extrapolation and interpolation methods into speed of sound variables for each incremental range and depth within the volume shown in FIG. 3.

Figure 5:
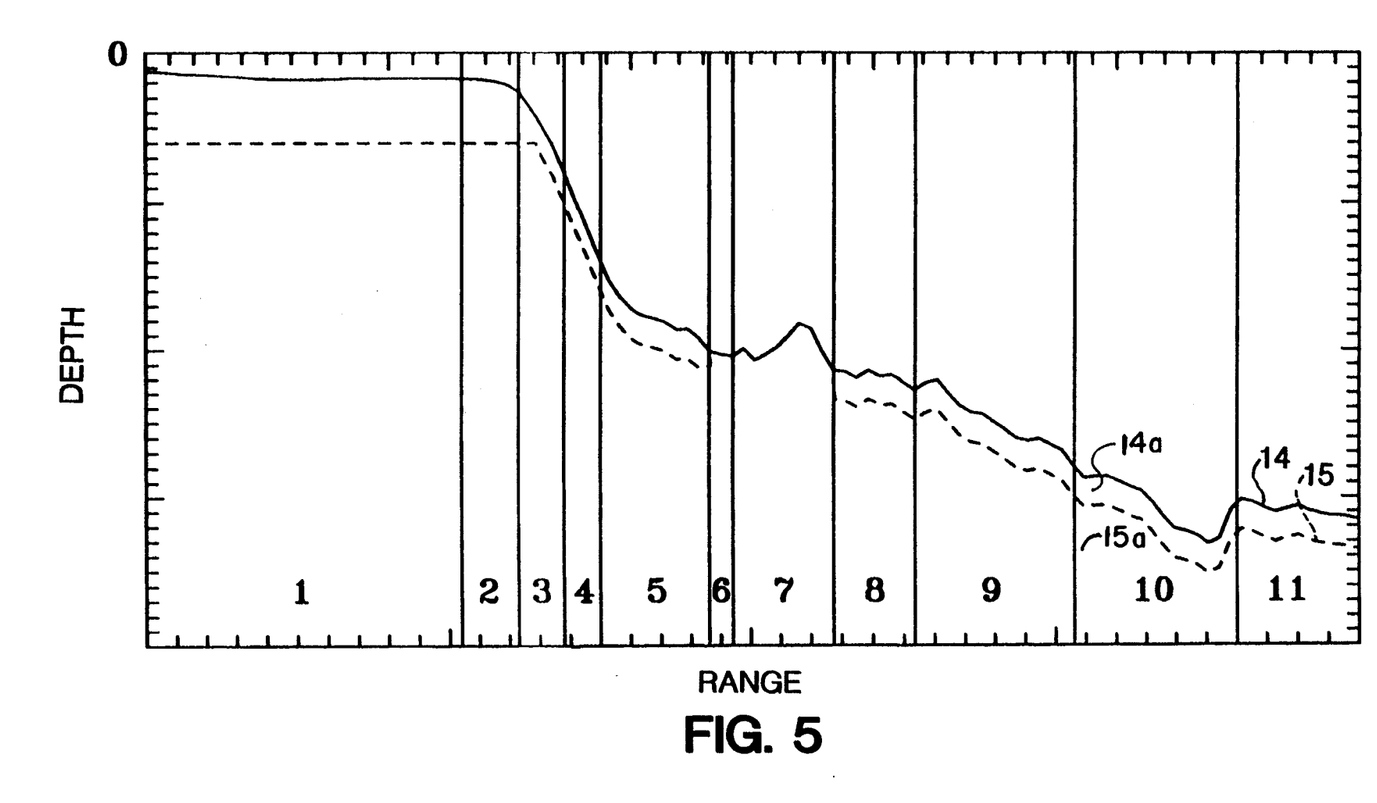
FIG. 5 depicts other acoustic properties of the bottom and subbottom of the volume within a vertical slice taken along a line from the linear transducer array of the volume shown in FIG. 3.

FIG. 5 represents measured bathythermy data that depicts the depth at different ranges from the array along a line emanating from the array. This information and information about bottom composition can be combined to obtain acoustically pertinent variables concerning depth and bottom type as it relates to the propagation and absorption of the acoustic field in the bottom 14a and the subbottom 15a concerning salinity, temperature, density and other factors related to the speed of sound through the medium at different incremental depths and ranges.

Figure 6:
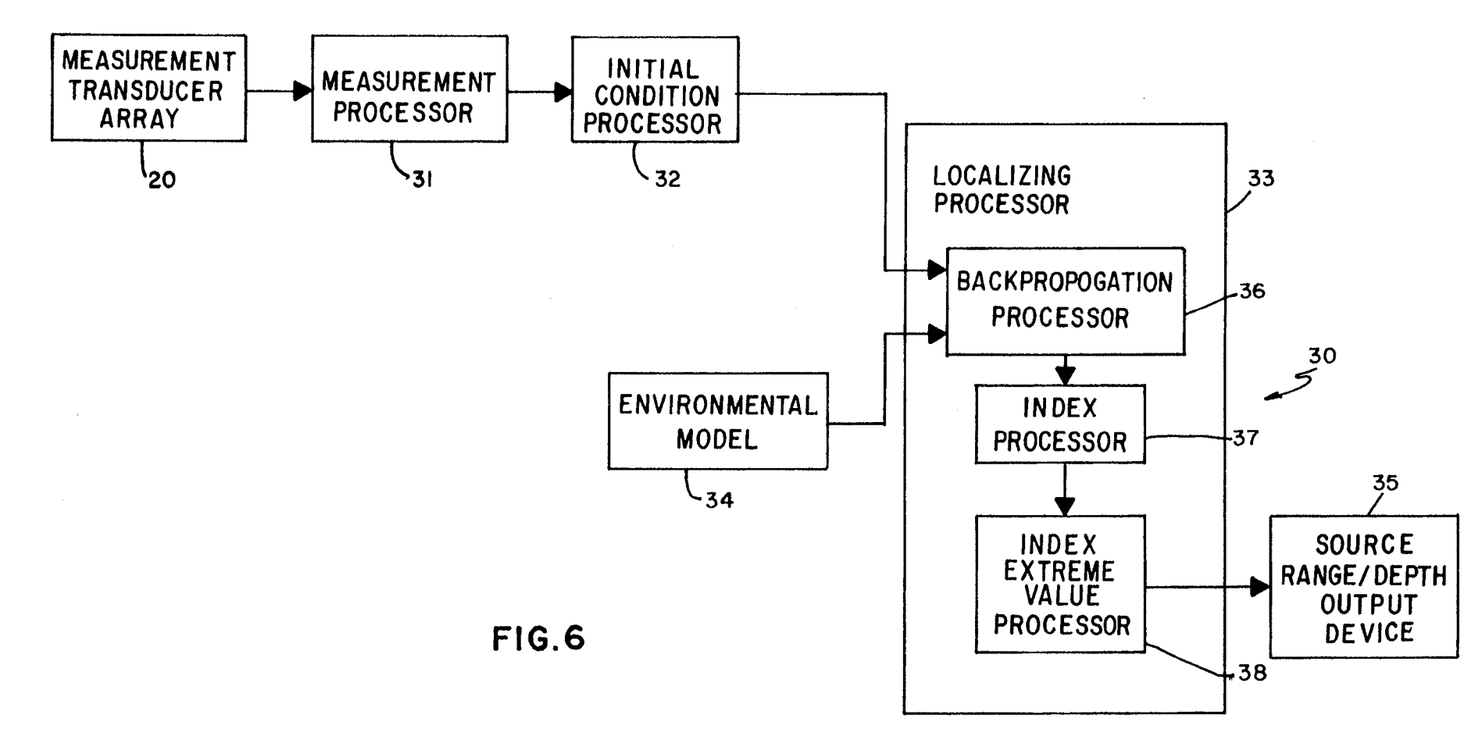
FIG. 6 is a block diagram that depicts apparatus for providing the range and depth location.

Referring now to FIG. 6, the measurement transducer array 20 supplies signals to range and depth apparatus 30 constructed and operated in accordance with this invention. A measurement processor 31 and initial condition processor 32 provide information to a localizing processor 33 concerning the measured acoustic field. An environmental model 34 contains the acoustically pertinent variables as functions of range and depth. The localizing processor 33 determines the range and depth to the acoustic source 10 in FIG. 1 and produces that information at a source range/depth output device 35.

The localizing processor 33 in one particular embodiment includes a backpropagation processor 36 that solves the wide angle parabolic function by means of the implicit finite difference solution used in a backpropagation mode. An index processor 37 produces indices based upon the signals representing the various solutions from the backpropagation processor 36. An index extreme value processor 38 ascertains an extreme value of the indices, a maximum for this embodiment. The range and depth at which that extreme value occurs is taken as the range and depth to the acoustic source.

The localizing system 30 in FIG. 6 can operate with either incoherent data or coherent data. Most of the operations are essentially the same, although detailed steps within each operation may change due to the selection of one or the other of incoherent and coherent data. In the following discussion, subscripts "I" and "C" designate functions or operations that are sensitive to that selection.

Still referring to FIG. 6, the measurement processor 31 samples signals from each of the transducers 21 shown in FIG. 1. Each signal represents a complex pressure, $p(r,z;\omega,t)$, where "r" is the range, "z" is the depth, "$\omega$" is the frequency of the incoming signal and "t" is the time of the measurement. Moreover the measurement processor 31 averages the signal from each transducer to minimize Gaussian white noise and suppresses interfering signals.

The selection of coherent or incoherent processing determines the operation of the measurement processor 31. If the localizing system 30 uses coherent values, the measurement processor 31 produces a coherent signal, $P_c$ given by:

$$p_c = <p(r, z; \omega,t)> \qquad (1)$$

4,484

METHOD AND APPARATUS FOR LOCATING AN ACOUSTIC SOURCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention is generally related to the location of an acoustic source in a fluid medium and more specifically to a method and apparatus for locating such a remote acoustic source by range and depth in the medium.

(2) Description of the Prior Art

Over the past several years diverse methods and apparatus have been developed for locating a remote acoustic source by its range and depth, particularly in the ocean. Examples of these systems are described in Bates, S. M. and Bilazarian, P., "The Comparison, Benchmarking, and Application To Source Localization of Low Frequency Underwater Acoustic Propagation Models" I.E.E.E. Oceans '90 Proco, 209-215 (1990).

Certain of these methods and apparatus depend upon a geometrical analysis. For example, multiple sensors at different locations can establish horizontal bearings or vertical angles called depression/elevation angles. Also a single sensor can be moved over time to a different location to establish bearings and depression/elevation angles. An intersection of those bearings or depression/elevation angles is taken as the location of the acoustic source. Such systems generally use simplified ocean acoustic models. For example, when the sound-speed is assumed to be constant over the entire ocean, acoustic rays tend to follow cyclical paths that can intersect at different locations or convergent zones. Thus, although the convergence of the rays at one zone can be taken as the location of an acoustic source, the specific location has some ambiguity with respect to other convergence zones.

Other methods and apparatus utilize a sensor array to receive the acoustic signals and produce an acoustic field distribution at the array location. Then a system uses a forward propagation analysis by effectively positioning a hypothetical source at successive ranges and depths within each range throughout a predetermined geographical area. At each range and depth, the signals from the source are propagated to the array. The sampled and propagated distributions are compared at each successive source location. The acoustic source is taken to be at a location from which the forward propagated acoustic field most closely matches the measured field. Such systems, while relatively accurate, are expensive to implement since the number of possible source locations is extremely large.

Bates, S. M. and Bates, B. J., "Source Localization By Inversion of The Parabolic Equation Method", J. Acoust. Soc. Am. 85,S18 (1989) suggest the localization of an acoustic source by backpropagating measurements from a vertical array utilizing a narrow angle (i.e., less than ±20°) parabolic equation solved by a so-called "split-step" method. In accordance with this approach, an initial field is established by measurement at a vertical transducer array. Then the parabolic algorithm is solved by the split-step method for successive incremental ranges expanding from the array. More specifically, the amplitude and phase of the signal are added coherently to the existing field and the result is propagated to the next source range and depth. This analysis over the respective ranges and depths theoretically yields a maximum amplitude at a range and depth corresponding to the location of the acoustic source. Although this approach is more efficient than the previously described prior art approaches, it does not permit the use of all accurate oceanographic databases that define acoustically pertinent variables. Consequently, a method and apparatus based upon the split-step parabolic solution, like the other prior art methods and apparatus severely limits the use of acoustically pertinent variables and introduces some uncertainty in the results. However, with the incorporation of more detailed ocean acoustic models and the addition of an index, initialization, and wide angle capability, the split-step method could be an alternative to the IFD method.

Lee, D. and Botseas, G., "IFD: An Implicit Finite-Difference Computer Model For Solving The Parabolic Equation", NUSC TR659, 1983, is a publicly available paper that describes a wide angle implicit finite difference solution for the wide angle parabolic equation. This solution forward propagates a field from a source and is particularly adapted for incorporating a wide variety of acoustically pertinent variables. However, this solution has not been utilized or suggested for use in the localization of an acoustic source from a remote location. Although it could be used as an alternative to the forward propagation techniques described above, that use would not overcome the inherent problems involved with forward propagation approaches.

SUMMARY OF THE INVENTION

Therefore it is an object of this invention for providing a method and apparatus that determines the range and depth of a remote acoustic source in a fluid medium.

Still another object of this invention is to provide a method and apparatus for providing the range and depth to a remote acoustic source in water that approximates range and depth with reasonable accuracy.

Still another object of this invention is to provide a method and apparatus for obtaining the range and depth to a remote acoustic source in water that utilizes acoustically pertinent information concerning water conditions.

In accordance with this invention, range and depth to an object in a given volume from a remote sampling site is obtained by combining a measured acoustic field distribution at a sampling site and known acoustically pertinent variables related to known acoustic energy transfer characteristics throughout the given volume. The measured acoustic field at the sampling site provides a distribution of the acoustic field as a function of depth. Processing the sampled acoustic field distribution and the acoustically pertinent variables for each incremental range and depth iteratively from the sampling site provides a field amplitude for each incremental range and depth. The range and depth at which an index, based upon the field amplitude, has an extreme value is used to determine the range to and depth of the object relative to the sampling site.

where "<>" represents a statistical averaging process that can be accomplished by any of several known correlation methods. If the localizing system 30 operates with incoherent values, the measurement processor 31 produces only a real part of the signal given by:

$$P_I = P_r = <P^*(r, Z; \omega, t)p(r,z;\omega,t)>^{\frac{1}{2}} \quad (2)$$

where p* represents a complex conjugate function.

The initial condition processor 32 converts either the incoherent or the coherent pressure measurements from the measurement processor 31 into the initial acoustic field for each transducer given by:

$$u_{I,C}(r_{max}, z) = \frac{P_{I,C}(r_{max}, z)}{v(r_{max})} \quad (3)$$

where u represents the amplitude modulation of the signal, $v$, an estimated Hankel function, and $u_{I,c}$ and $P_{I,c}$, results obtained by incoherent and coherent processing.

The backpropagation processor 36, in a specific embodiment of this invention, utilizes a wide angle parabolic wave equation for determining the position of the acoustic source. In a forward propagating method for solving the wide angle parabolic equation, the reduced wave equation for an harmonic source with cylindrical symmetry is:

$$[a_r^2 + r^{-1}a_r + a_z^2 + k_0^2 n^2(r,z)]p(r,z) = 0 \quad (4)$$

where $a_r^2$ and $a_r$ are the second order and first order differentials of either of the pressure equations 1 or 2 with respect to range and $a_z^2$ is the second order differential of either of the pressure equations (1) or (2) with respect to depth, $k_o$ is a reference wave number and $$p(r,z) = u(r,z)\, v(r) \quad (5)$$

This equation indicates that the pressure has a range and depth dependent amplitude modulation $u(r, z)$; $v(r)$ is the zeroth order Hankel function of the first kind.

The outgoing wave equation satisfies:

$$a_r + i(k_0 - Q^{\frac{1}{2}})u\,(r,\,z) = 0 \quad (6)$$

where equation (6) can be approximated by:

$$Q^{\frac{1}{2}} = [k_0^2 + k_0^2(n^2(r,\,z)-1) + a_z^2]^{\frac{1}{2}} = k_0(1+q)^{\frac{1}{2}} \quad (7)$$

Claerbout wide angle domain values of $A = C = 1$, $B = \frac{3}{4}$, and $D = \frac{1}{4}$ provide accurate solutions for propagation within $\pm 40°$ of a horizontal direction. In terms of the specific embodiment shown in FIG. 1, the range of $\pm 40°$ is shown by lines 40 and 41. Solving equation (7) using these domain values yields:

$$Q^{\frac{1}{2}} \approx k_0 \left[ \frac{A + Bq}{C + Dq} \right] \quad (8)$$

The previously described implicit finite difference method for forward propagation can be solved by:

$$\Omega(-\Delta r/2,z)u(r+\Delta r,z) + B(r+\Delta r,z) = \Omega(\Delta r/2,-z)u)r,z) + B(r,z) \quad (9)$$

where $\Omega(-\Delta r/2,z)$ transforms the solution of $u(r+\Delta r, z)$ back one half range step, $\Omega(\Delta r/2,z)$ transforms the solution forward one half range step, $B(r+\Delta r, z)$ incorporates the acoustically pertinent variables at the range $(r+\Delta r)$ and $B(r,z)$ incorporates acoustically pertinent variables at the range r.

The environmental model 34 supplies the acoustically pertinent variables for the ranges r and $(r+\Delta r)$. In this equation the acoustically pertinent variables include sound speed as extrapolated or interpolated from the information such as shown in FIG. 4 and density and sound speed variations in the bottom and sub-bottom as represented by FIG. 5.

In accordance with this invention, equation (9) is modified to produce an initial amplitude function $u(r,z)$ by backpropagation in accordance with:

$$u(r,z) = \Omega^{-1}(\Delta r/2,z)[\Omega(-\Delta r/2,z)u(r+\Delta r,z) + B(r+\Delta r,z) - B(r,z)] \quad (10)$$

where the solutions for $u(r,z)$ are from $r_{max}$ to 0 in steps of $-\Delta r$. Stated differently, during each iteration the backpropagation processor 36 calculates for each incremental range and depth the amplitude of a field at that range and depth necessary to produce the field in the prior adjacent range and depth. When a range reaches a zero value, the resulting amplitude functions u describe the acoustic field in range and depth over the volume between the sampling site and a maximum range. The estimated pressure at a range "r" and a depth "z" is given by:

$$p(r,z) = u(r,z)v(r) \quad (11)$$

To implement this invention using the implicit finite difference solution to the wide angle parabolic equation, several modifications must be made to the existing wide angle implicit finite difference program so it operates in accordance with backpropagation techniques. These can be identified as follows with respect to the information provided in the above-identified Lee et al. article:

INPUT.DATA—set an ISF field equal to 1; this produces an initial acoustic field by calling a UFIELD.FOR subroutine.

UFIELD.FOR—this subroutine reads the measured acoustic field as a function of depth, setting the acoustic field to 0 when no data is to be measured. If incoherent processing only is used, an imaginary component is set to zero.

SSP.FOR—a subroutine that uses information in the environmental model to determine, for the input range, the sound speed as a function of depth and the ocean water/floor and subfloor interface depths.

INPUT.DATA—various input data locations are initialized as follows:

RA—set to a range that exceeds the expected range to the source in order to establish a boundary limit for the backpropagation process.

DR—set to a negative number to produce backpropagation.

RMAX—this is the maximum range for forward propagation; it is set to 0.

BETA—An attenuation coefficient is set to 0.

IFD.FOR—This subroutine establishes comparisons of the current range RA. All occurrences of ">" are changed to "<" and all occurrences of "<" are changed to ">" to accommodate the backpropagation implementation. The solutions for the depth of the boundary layer by changing lines 50 and 150 from:

```
50 ZLYR(ILYR) =
          ZLYR(ILYR) + (RA − RSVP)*TAN(THETA)
to
50 ZLYR(ILYR) =
          ZLYR(ILYR) + (RSVP − RA)*TAN(THETA)
and
150 RSVP = 1.0E + 38
to
150 RSVP = 0.0.
```

Figure 7:
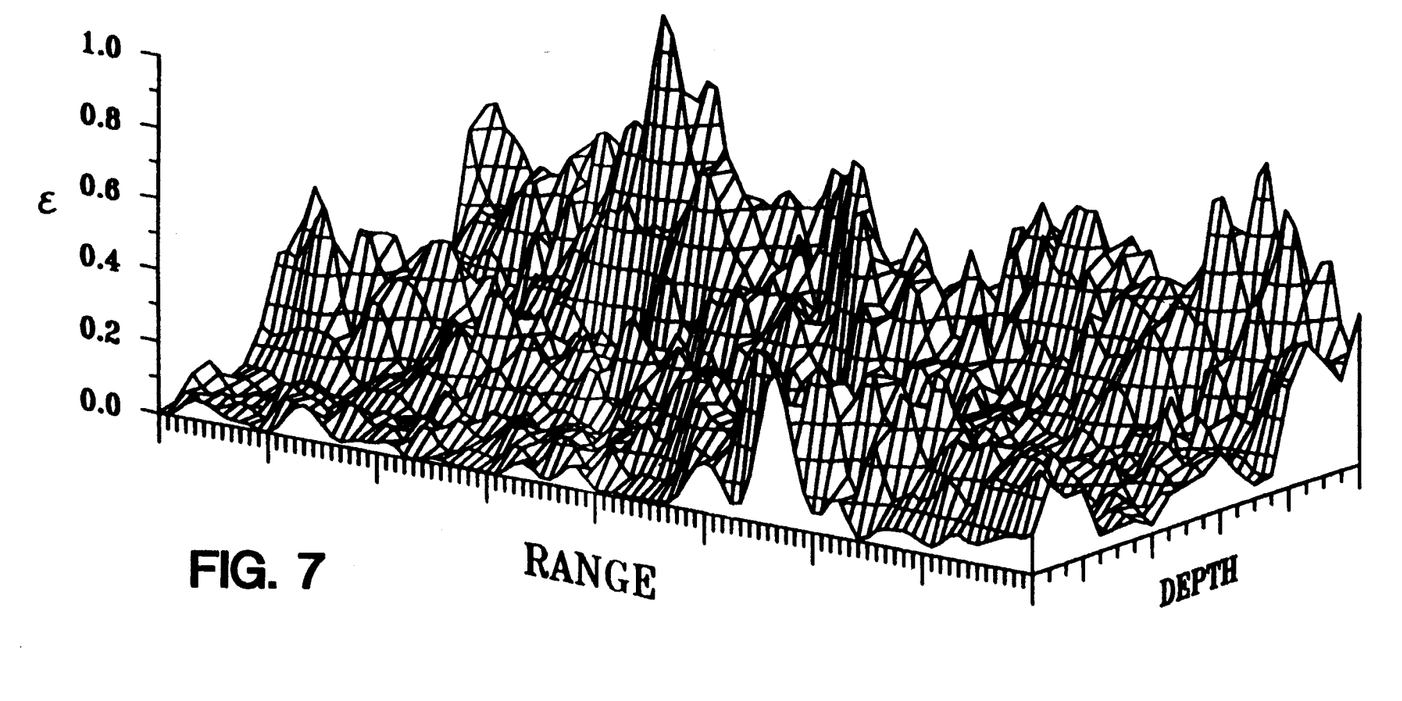
FIG. 7 is a view of data obtained from the apparatus in FIG. 6 that locates the range and depth to the acoustic source.

The amplitude of the field at each location in the volume from the backpropagation processor 36 transfers to the index processor 37. In one specific embodiment the index processor 37 utilizes equation (11) to produce an index according to $$\epsilon_{I,C}(r, z) = u_{I,C}(r, z) \, u^*_{I,C}(r, z) \quad (12)$$

where $u^*$ is the complex conjugate of the pressure modulation function $u(r,z)$ for the incoherent (I) or coherent (C) values. The index processor 37 essentially computes the index for each position. FIG. 7 presents a plot of the index values over the range produced by backpropagation over the range from the linear array 20 in FIG. 1 to the object 10.

The index extreme value processor 38 utilizes the information shown in FIG. 7 and derived from equation (12) to locate an extreme value of the index. In most cases this is the maximum value as given by $$\epsilon(r, z) = \max_{\substack{0 \leq r \leq r_{max} \\ 0 \leq z \leq z_{max}}} \epsilon(r, z) \quad (13)$$

However, it is also possible to use minimum or zero values as the extreme value for an appropriately defined index. The output device 35 computes the source range and depth relative to the receiver according to $$r_0 = r = r_{max} - r \quad (14)$$

and at a depth given by $$z_0 = z, \quad (15)$$

where $r_0$ is the estimated source range and $z_0$ is the estimated source depth. In an ideal situation, the localizer processor 33 and related circuitry locate the source without error because the extreme value processor 38 finds only one maximum value. In actual applications such as shown in the environment of FIGS. 2 through 5 and as displayed in FIG. 7, the data tends to produce a distribution of local maxima. For example, coherent processing with the specific method and apparatus described with respect to FIG. 6 using a 200 Hz harmonic point source at a depth of 60 meters and 10 km away from the array 20 and with a range increment of 2 meters produced five local maxima above a certain level (i.e. $\epsilon > 0.9$), as depicted in FIG. 7. However, only the global maximum (i.e., the maximum with the largest amplitude) was found at an estimated range of 10.006 km and an estimated depth of 58.3 meters. This represents less than 1% error in range and less than a 3% error in depth.

When the array 20 shown in FIG. 1 is limited to extend only from the surface 13 in FIG. 1 for a total length of about 25% of the depth, the range error remains substantially unchanged. The depth error, as a function of actual depth, increases to 50%, as would be expected because the amount of the data received at the array is only about 25% of the data received by the full array 20. Depth errors of that magnitude, however, are acceptable, particularly as depth error as a percentage of total ocean depth is relatively insignificant. The use of incoherent processing with a full array of transducers provides a greater range error, but reduces the depth range error. These comparisons indicate that full depth monitoring and coherent processing provide the best estimation of both range and depth, but that partial transducer arrays and incoherent processing provide acceptable estimates of range and depth.

If the acoustically pertinent variables from the environmental model 34 are replaced with various simplified assumptions, the range error increases significantly. This solution also produces a single maximum with $\epsilon > 0.9$ and therefore produces a high degree of confidence in a localization estimate with a major range error. Consequently the use of actual acoustically pertinent variables improves the accuracy of and confidence in a localization estimate.

A second receiver located 20 km from the source using a full array and coherent processing and the full environmental model information produces a range error of less than 7% of the actual range and a depth error of about 53% of the actual depth. However, again, the depth error is within acceptable limits as it is insignificant when viewed as a percentage of the total ocean depth.

From the foregoing discussion it will be apparent that a number of variations can be utilized in implementing this invention, particularly of these that could modify the expressly disclosed backpropagation implicit finite difference solution for the wide angle parabolic equation. For example, other solutions to the wide angle parabolic equation might be made such as a wide-angle split-step method or a finite element method. The process of suppressing interfering signals in the measurement processor can be performed in the localizing processor 33. However, each variation will include the basic steps of sampling of the acoustic field at a sampling site. Each will include processing information from that sample along with known acoustically pertinent variables for each range and depth to produce an input for analysis to determine the location of an extreme value that corresponds to the range and depth of the acoustic source.

This invention has been disclosed in terms of certain embodiments. It will be apparent that many modifications can be made to the disclosed method and apparatus without departing from the invention. Therefore, it is the intent of the appended claims to cover all such variations and modifications as come within the true spirit and scope of this invention.

What is claimed is:

1. A method for determining the range and depth of an object in a given volume of a medium from a remote sampling site in the medium wherein the given volume is characterized by having a maximum range from the sampling site and wherein an acoustic field propagates from the object to the sampling site and the medium has known acoustically pertinent variables corresponding to known physical acoustic energy transfer characteristics at different ranges and depths throughout the medium, said method comprising the steps of:

sampling the distribution of the acoustic field at the sampling site as a function of depth;

processing the sampled acoustic field distribution and acoustically pertinent variables for each range and depth in an iterative process whereby during each iteration said processing generates a signal with a given amplitude; and locating a range and a depth at which the signal has an extreme value whereby the range and depth at which the extreme value exists are used to determine the range to and depth of the object.

2. A method as recited in claim 1 wherein said processing includes: generating a field distribution during each iteration for an incremental range and depth based upon a backpropagation of an initial acoustic field.

3. A method as recited in claim 2 wherein said sampling includes:

obtaining simultaneously complex pressure readings from each of a plurality of predetermined depths at the sampling site; and determining from the readings the initial acoustic field as a function of depth.

4. A method as recited in claim 3 wherein said locating of the range and depth includes:

generating an index signal having an amplitude corresponding to the amplitude of the backpropagation field at each incremental range and depth; and determining the extreme value of the index signal based upon a maximum value thereof.

5. A method as recited in claim 2 wherein said processing includes generating an acoustic field distribution based upon the acoustic field at the sampling site by using an implicit finite difference solution to a wide angle parabolic equation according to $$u(r,z) = \Omega^{-1}(\Delta r/2,z)[\Omega(-\Delta r/2,z)u(r+\Delta r,z) + B(r+\Delta r,z) - B(r,z)]$$

wherein $\Omega(-\Delta r/2,z)$ transforms the solution of $u(r+\Delta r, z)$ back one half of a range step, $\Omega(\Delta r/2,z)$ transforms the solution forward one half of a range step and B(r) and B(r+$\Delta r$, z) incorporate the acoustic pertinent variables for the ranges r and (r+$\Delta r$).

6. A method as recited in claim 2 wherein said processing includes generating an acoustic field distribution based upon the acoustic field at the sampling site by using an implicit finite difference solution to a wide angle parabolic equation.

7. A method as recited in claim 6 wherein said locating of the range and depth includes:

generating an index signal having an amplitude corresponding to the amplitude of the backpropagated field at the range and depth; and determining the extreme value of the index signal based upon a maximum value thereof.

8. A method as recited in claim 7 wherein said sampling includes the steps of:

obtaining simultaneously complex pressure readings from each of a plurality of pressure transducers located in a vertical array at predetermined different depths; and converting the readings for obtaining initial values at each of the transducers for providing an initial acoustic field distribution at the sampling site as a function of depth for use in said processing step.

9. A method as recited in claim 8 wherein the readings obtained from each pressure transducer have the form $p(r,z;\omega,t)$ and said conversion includes coherently processing the readings to obtain an initial value "$P_c$" given by $$p_c = <p(r,z;\omega,t)>$$

where "r" is the range, "z" is the depth, "$\omega$" is the frequency of the acoustic signal, "t" is the time, and "$<>$" represents an averaging of the function.

10. A method as recited in claim 8 wherein the readings obtained from each pressure transducer have the form $p(r,z;\omega,t)$ and said conversion includes incoherently processing the readings to obtain an initial value "$P_r$" given by $$p_I = p_r = <p^*(r,z;\omega,t)p(r,z;\omega,t)>^{\frac{1}{2}}$$

where "r" is the range, "z" is the depth, "$\omega$" is the frequency of the acoustic signal, "t" is the time, "p*" represents the complex conjugate of the pressure function, and "$<>$" represents an averaging of the function.

11. A method as recited in claim 8 wherein said sampling includes obtaining simultaneously complex pressure readings from each of a plurality of predetermined depths at the sampling site by a corresponding plurality of pressure transducers and determining from the readings the initial acoustic field as a function of depth.

12. A method as recited in claim 11 wherein the readings obtained from each pressure transducer have the form $p(r,z;\omega, t)$ and said conversion includes coherently processing the readings to obtain an initial value "$P_c$" given by $$p_c = <p(r,z;\omega,t)>$$

where "r" is the range, "z" is the depth, "$\omega$" is the frequency of the acoustic signal, "t" is the time, and "$<>$" represents an averaging of the function.

13. A method as recited in claim 11 wherein the readings obtained from each pressure transducer have the form $p(r,z;\omega,t)$ and said conversion includes incoherently processing the readings to obtain an initial value "$P_r$" given by $$p_I = p_r = <p^*(r,z;\omega,t)p(r,z;\omega,t)>^{\frac{1}{2}}$$

where "r" is the range, "z" is the depth, "$\omega$" is the frequency of the acoustic signal, "t" is the time, "p*" represents the complex conjugate of the pressure function, and "$<>$" represents an averaging of the function.

14. A method as recited in claim 1 wherein said locating of the range and depth includes:

generating an index signal having an amplitude corresponding to the amplitude of the backpropagated field at the range and depth;

determining the extreme value of the index signal based upon a maximum value thereof; and determining the range to and depth of the object relative to the array.

15. A method as recited in claim 14 wherein said index signal generating step produces, for each iteration of said processing step, an index signal according to $$\epsilon_{I,C}(r,z) = u_{I,C}(r,z)u_{I,C}(r,z),$$

said extreme value determining step includes finding the location of the maximum value of the index signal according to $$\epsilon(r, z) = \max \quad \epsilon(r, z);$$

-continued $$0 \leq r \leq r_{max}$$
$$0 \leq z \leq z_{max}$$

and calculating the range to and depth of the source according to:

$$r_0 = r = r_{max} - r,$$

and $$z_0 = z.$$

16. Apparatus for determining the range and depth of an object in a given volume of a medium from a remote sampling site in the medium wherein the given volume is characterized by having a maximum range from the sampling site and wherein an acoustic field propagates from the object to the sampling site and the medium has known acoustically pertinent variables corresponding to known acoustic energy transfer characteristics at different ranges and depths throughout the volume, said apparatus comprising:

means for sampling the distribution of the acoustic field at the sampling site as a function of depth;

means for processing the sampled acoustic field distribution and the acoustically pertinent variables for each range and depth in an iterative process whereby during each iteration said processing means generates a signal with a given amplitude; and means for locating a range and depth at which the signal has an extreme value whereby the range and depth at which the extreme exists is used to determine the range to and depth of the object.

17. Apparatus as recited in claim 16 wherein said processing means generates a field distribution during each iteration for an incremental range and depth based upon a backpropagation of an initial acoustic field.

18. Apparatus as recited in claim 17 wherein said sampling includes:

means for obtaining simultaneously complex pressure readings from each of a plurality of predetermined depths at the sampling site; and means for determining from the readings the initial acoustic field as a function of depth.

19. Apparatus as recited in claim 18 wherein said locating of the range and depth includes:

index processor means for generating an index signal having an amplitude corresponding to the amplitude of the backpropagated field at each incremental range and depth; and index extreme value processor means for determining the extreme value of the index signal based upon a maximum value thereof.

20. Apparatus as recited in claim 17 wherein said processing includes backpropagation processor means for generating an acoustic field distribution at successive incremental ranges and depths based upon the acoustic field at the sampling site by using an implicit finite difference solution to a wide angle parabolic equation according to $$u(r,z) = \Omega^{-1}(\Delta r/2, z)[\Omega(-\Delta r/2, z)u(r+\Delta r, z) + B(r+\Delta r, z) - B(r, z)]$$

wherein $\Omega(-\Delta r/2, z)$ transforms the solution of $u(r+\Delta r, z)$ back one half of a range step, $\Omega(\Delta r/2, z)$ transforms the solution $u(r, z)$ forward one half of a range step and $B(r)$ and $B(r+\Delta r, z)$ incorporate the acoustically pertinent variables for the ranges $r$ and $(r + \Delta r)$.

21. Apparatus as recited in claim 17 wherein said processing means includes backpropagation processor means for generating an acoustic field distribution at successive incremental ranges and depths based upon the acoustic field at the sampling site by using the backpropagation of an implicit finite difference solution to a wide angle parabolic equation.

22. Apparatus as recited in claim 21 wherein said locating means includes:

index processor means generating an index signal having an amplitude corresponding to the amplitude of the backpropagated field at each incremental range and depth; and index extreme value processor means for determining the extreme value of the index signal based upon a maximum value thereof.

23. Apparatus as recited in claim 21 wherein said sampling means includes:

transducer array means for obtaining simultaneously complex pressure readings from each of a plurality of pressure transducers located in a vertical array at different predetermined depths; and measurement processor means for converting the readings into initial values at each of the transducers thereby to obtain an initial acoustic field distribution at the sampling site as a function of depth for use by said processing means.

24. Apparatus as recited in claim 23 wherein the readings obtained from each pressure transducer means have the form $p(r,z;\omega,t)$ and said conversion means includes means for coherently processing the readings to obtain an initial value "$P_c$" given by $$p_c = \langle p(r,z;\omega,t) \rangle$$

where "r" is the range, "z" is the depth, "$\omega$" is the frequency of the acoustic signal, "t" is the time, and "$\langle \rangle$" represents an averaging of the function.

25. Apparatus as recited in claim 23 wherein the readings obtained from each pressure transducer means have the form $p(r,z;\omega,t)$ and said conversion includes means for incoherently processing the readings to obtain an initial value "$P_I$" given by $$p_I = p_r = \langle p^*(r,z;\omega,t) p(r,z;\omega,t) \rangle^{\frac{1}{2}}$$

where "r" is the range, "z" is the depth, "$\omega$" is the frequency of the acoustic signal, "t" is the time, "$p^*$" represents the complex conjugate of the pressure function, and "$\langle \rangle$" represents an averaging of the function.

26. Apparatus as recited in claim 23 wherein said sampling means includes:

means for obtaining simultaneously complex pressure readings from each of a plurality of predetermined depths at the sampling site by a corresponding pressure transducer means; and means for determining from the readings the initial acoustic field as a function of depth.

27. Apparatus as recited in claim 26 wherein the readings obtained from each pressure transducer means have the form $p(r,z;\omega,t)$ and said conversion includes coherently processing the readings to obtain an initial value "$P_c$" given by $$p_c = \langle p(r,z;\omega,t) \rangle$$

where "r" is the range, "z" is the depth, "ω" is the frequency of the acoustic signal, "t" is the time, and "⟨ ⟩" represents an averaging of the function.

28. Apparatus as recited in claim 26 wherein the readings obtained from each pressure transducer means have the form p(r,z;ω,t) and said conversion includes incoherently processing the readings to obtain an initial value "$P_r$" given by $$p_I = p_r = \langle p^*(r,z;\omega,t) p(r,z;\omega,t) \rangle^{\frac{1}{2}}$$

where "r" is the range, "z" is the depth, "ω" is the frequency of the acoustic signal, "t" is the time, "p*" represents the complex conjugate of the pressure function, and "⟨ ⟩" represents an averaging of the function.

29. Apparatus as recited in claim 16 wherein said locating means includes:
   index processor means generating an index signal having an amplitude corresponding to the amplitude of the backpropagated field at the range and depth; and
   index extreme value processor means for determining the extreme value of the index signal based upon a maximum value thereof.

30. Apparatus as recited in claim 29 wherein said index signal processor means produces, for each iteration of said processing step, an index signal according to $$\epsilon_{I,C}(r,z) = u^*_{I,C}(r,z) u_{I,C}(r,z)$$

and said extreme value processor means includes means for locating the range and depth corresponding to the location of a maximum value of the index signal according to $$\epsilon(r,z) = \max_{\substack{0 \leq r \leq r_{max} \\ 0 \leq z \leq z_{max}}} \epsilon(r,z);$$

and calculating the range to and depth of the source according to:

$$r_0 = r = r_{max} - r,$$

and $$z_0 = z.$$

* * * * *